United States Patent [19]

Ciocca

[11] Patent Number: 5,303,877
[45] Date of Patent: Apr. 19, 1994

[54] LINEAR WINDING ASSEMBLY

[76] Inventor: Quintino M. Ciocca, 620 Saxonburg Blvd., Pittsburgh, Pa. 15238

[21] Appl. No.: 876,443

[22] Filed: Apr. 30, 1992

[51] Int. Cl.⁵ .......................................... A01K 89/01
[52] U.S. Cl. .................................................. 242/256
[58] Field of Search ........................ 242/256, 249, 224

[56] References Cited

U.S. PATENT DOCUMENTS

| | | | |
|---|---|---|---|
| 389,070 | 9/1888 | Gillet | 242/256 |
| 2,130,671 | 9/1938 | Maynes | 242/256 |
| 2,220,017 | 10/1940 | Maynes | 242/256 |
| 2,593,700 | 4/1952 | Rosner | 242/256 |
| 2,716,301 | 8/1955 | Lockwood | 242/256 |
| 4,524,922 | 6/1985 | Vivarelli | 242/256 |
| 4,850,545 | 7/1989 | Faulkner | 242/256 |

*Primary Examiner*—Katherine Matecki
*Attorney, Agent, or Firm*—George C. Atwell

[57] ABSTRACT

A linear winding assembly for reeling in the fishing line of a fishing reel, the winding assembly for retrofitting in the housing of the reel so the user can reel in the line without turning the handle, thus freeing one of his hands for other purposes. The winding assembly includes a cylindrical pulley housing disposed on the shaft of the reel, a roller retainer positioned within the pulley housing and having a pair of spaced-apart rollers that rotate within the pulley housing and a flat clutch plate abutting the pulley housing and having a surface upon which the rollers ride. Concentric with the shaft and positioned in linear axial alignment adjacent the pulley housing counterbore is a pulley gear pressed to the pulley housing and a driven gear mounted to a clutch bearing which is mounted on the shaft. A trigger is mounted to the slider member, and the slider member is mounted within the stem of the reel for reciprocable upward and downward movement. A bead chain is attached to the slider member and the pulley housing, respectively, and upwardly pulling on the trigger pulls on the bead chain which actuates rotational and longitudinal movement of the pulley housing causing the pulley gear to mesh with the driven gear. This causes the clutch bearing to lock onto and rotate the shaft, thus reeling in the line.

15 Claims, 8 Drawing Sheets

LINEAR WINDING ASSEMBLY

BACKGROUND OF THE INVENTION

The present invention relates to winding devices, and more particularly pertains to a linear winding assembly fitted within the housing of a fishing reel for reeling in the fishing line without turning the handle, thus freeing one of the user's arms for other purposes.

Various types of take-up mechanisms have been used to take up and let out the line of a fishing reel. Some types of mechanisms use a pawl and ratchet wheel for engaging or disengaging gears in order to wind in the fishing line. Other mechanisms employ a spool journaled to the fishing reel shaft for reeling in the line. Yet other mechanisms include rollers and overrunning clutches to actuate the reeling in of the fishing line.

One disadvantage with these mechanisms is that they can't be retrofitted into the housing of existing fishing reels. In order to utilize the above-mentioned mechanisms, the internal parts of the fishing reel must first be removed before the above mechanisms can be installed. Therefore, there is a need for a winding assembly that can be adapted and retrofitted to the wide variety of fishing reels on the market. In addition, there is a need for a winding assembly that can be easily retrofitted to existing fishing reels and yet permits the user to bypass the retrofitted winding assembly if the user desires to manually bring in the fishing line by turning the handle of the fishing reel.

SUMMARY OF THE INVENTION

The device of the present invention comprehends a linear winding assembly which can be installed or retrofitted in the housing of a fishing reel for reeling in the fishing line by actuation from a neutral position to an engaged position, thus turning the main drive shaft of the reel.

The winding assembly of the present invention is mounted to the main drive shaft of the fishing reel and is fully contained within the housing of the fishing reel. The winding assembly includes a cylindrical pulley housing which is mounted on the drive shaft for selective rotational and longitudinal movement. The pulley housing has a counterbore side and an opposite annular retainer flange side. A cylindrical roller retainer is pressed within the annular retainer flange of the pulley housing. Projecting from the roller retainer and spaced 180° from each other are a pair of roller axles, and pressed onto each axle for a running and sliding fit is a roller. The roller retainer rotates coincident with rotation of the pulley housing.

A generally flat, rectangular-shaped clutch plate is disposed within the housing and has a clutch, plate aperture through which the main drive shaft extends. The clutch plate extends the width of the housing and is positioned adjacent the pulley housing for enclosing the roller retainer therebetween. In addition, the clutch plate includes a circular, upraised roller surface formed thereon and axially aligned with the roller retainer. When the pulley housing is rotatably actuated, the rollers travel on the roller surface to facilitate the rotation of the roller housing.

A circular pulley gear is pressed into the counterbore of the pulley housing and is concentric thereto. The pulley gear is mounted on the main drive shaft, and there is an annular clearance between the pulley gear and the main drive shaft. Adjacent to the pulley gear is a cylindrical clutch bearing. The clutch bearing is mounted to the main drive shaft and permits rotation in only one direction by locking onto the main drive shaft when the winding assembly is in the engaged position. Mounted circumjacent and contiguous to the clutch bearing is a driven gear. The driven gear is axially aligned with the pulley gear and is adapted for selective engagement by the pulley gear in order to actuate rotation of the main drive shaft.

Disposed within the stem of the fishing rod is a cylindrical slider member. The slider member is fitted into the stem and adapted for reciprocable upward and downward movement. Mounted to the slider member and projecting outwardly therefrom is a trigger for grasping by the user. The trigger moves in conjunction with the slider member, and when the trigger is pulled upward by the user, rotatable and longitudinal movement of the pulley housing is actuated.

In order for the trigger to actuate the pulley housing, a bead chain is utilized to connect the trigger to the pulley housing. The bead chain has a first end mounted to the slider member, and, more specifically, the first end of the bead chain is secured in a retainer pocket formed in the lower end of the slider member. The second end of the bead chain is secured to the pulley housing, and further, a substantial portion of the bead chain rests within an annular chain track groove located on the pulley housing. When the trigger is pulled upward by the user, the bead chain unwinds causing the pulley housing to rotate and move in a linear direction toward the driven gear and the clutch bearing. Thus, the winding assembly is in the engaged position when the clutch bearing is locked onto the shaft of the reel.

In order to return the winding assembly to the disengaged position, a torsion spring is attached to the housing at the far end of the main shaft opposite the clutch plate, and also to the pulley housing. When the pulley housing is rotated to the engaged position, the torsion spring is wound as a result of that rotation. The user then releases his finger from the trigger, and the torsion spring unwinds and returns the pulley housing to its disengaged position. In addition, the unwinding of the torsion spring causes the pulley gear to disengage from the driven gear and the winding assembly is returned to the disengaged position. Thus, the continuous use of the winding assembly for bringing in a fishing line is facilitated by the torsion spring.

It is an objective of the present invention to provide a winding assembly which can be easily and quickly retrofitted within the housing and on the drive shaft of an existing fishing reel, or which can be installed as part of the internal structural components of a new fishing reel.

Another objective is to provide a winding assembly which can be continuously reused without the need for complicated internal adjustments.

Other objects of this invention will appear from the following description and appended claims, and also from the accompanying drawings wherein like reference characters designate corresponding parts in the several views.

DETAILED DESCRIPTION OF THE PREFERRED EMBODIMENT

Figure 1:
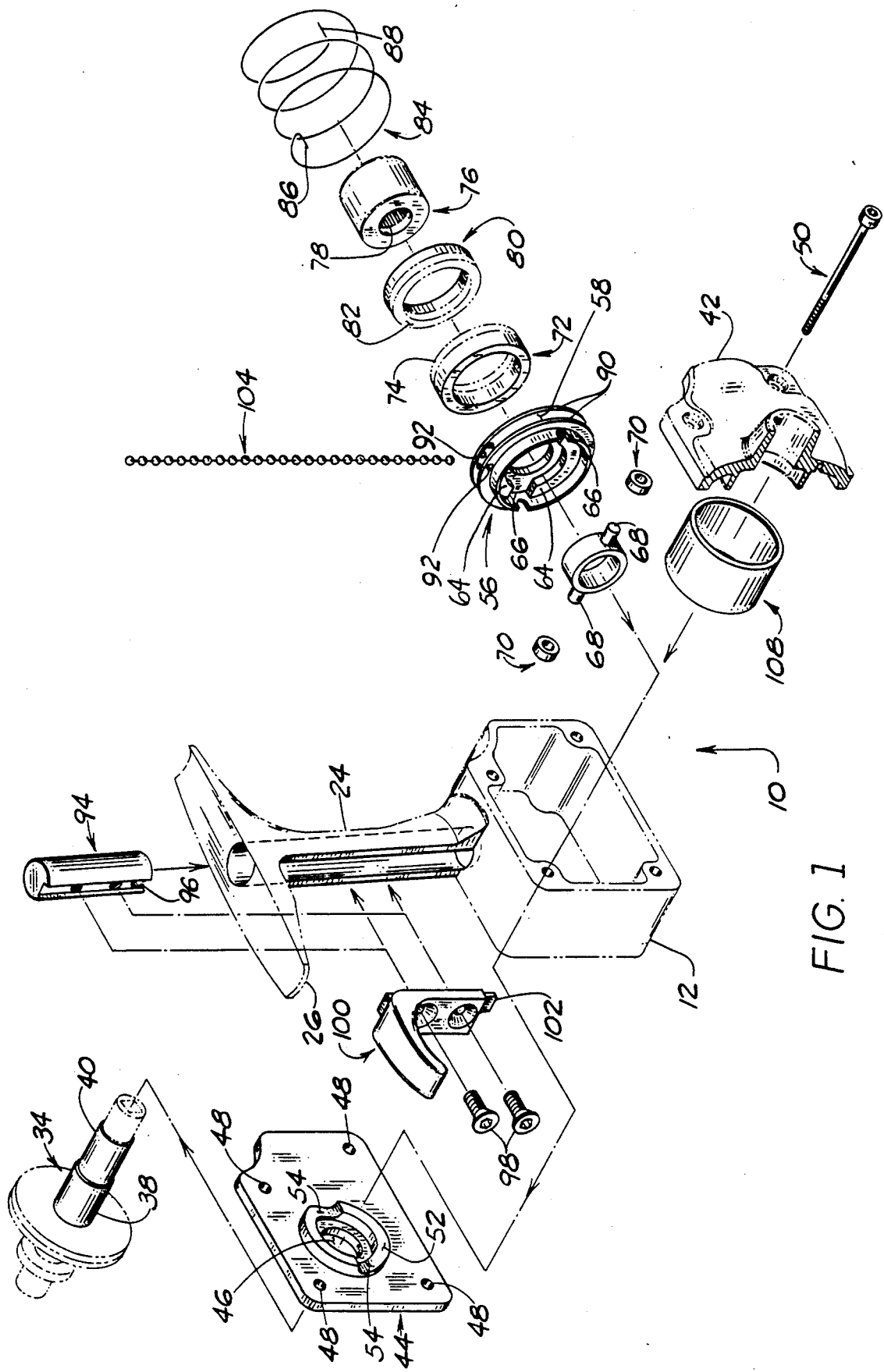
FIG. 1 is an exploded isometric view of the preferred embodiment of the linear winding assembly.

Referring to FIGS. 1–4, there is shown a first preferred embodiment of a linear winding assembly 10. The linear winding assembly 10 is mounted within a housing 12 of a fishing reel 14, the reel 14 including a rotatable bail assembly 16 and a spool assembly 18 which facilitate the letting out of or the reeling and taking in of a fishing line 20. The housing 12 of the reel 14 depends laterally from a fishing rod 22 by a stem 24 which may be a part of the housing 12 or a separate piece. The stem 24 has a flange member 26 which is mounted or secured into a recess or groove 28 on the rod 22 adjacent one end thereof. The reel 14 also includes a handle assembly 30, part of the handle assembly 30 projecting into and through the housing 12. The handle assembly 30 includes a handle knob 32 and a projecting member extending longitudinally through the housing 12 and into a main drive shaft 34.

Forming a part of the shaft 34, and being either mounted integrally thereto or placed thereon as a separate structural part, is a cylindrical drive gear and an oscillating or driven gear adjacent to and rotatably engaged by the drive gear. Both gears are disposed within the housing 12 and are actuated when the line 20 is let out or brought in. Inserted into the housing 12, opposite the end where the handle assembly 30 is located, is a handle screw cap 36. The cap 36 is inserted into the housing 12 and can be threaded into the far end of the shaft 34. The cap 36 maintains the linear or longitudinal extension of the shaft 34 within the housing 12, and, for disassembly, unscrewing the cap 36 is a necessary first step for removing the shaft 34 and other internal structural elements as shown in FIG. 2.

As shown in FIG. 1, the shaft 34 is stepped and includes a main drive shaft surface 38 and another surface which may be defined as a clutch bearing surface 40. Inner races or spacers can be placed on the far end of the shaft 34 for preventing structural parts on the assembly 10 from sliding on the shaft 34. A side cover 42 is mounted to the housing 12 adjacent the far end of the shaft 34 and includes an aperture through which a portion of the shaft 34 extends for threadable securement by the cap 36.

The assembly 10 of the first preferred embodiment is adapted for retrofitting into an existing fishing reel or the assembly 10 can be factory installed as part of the production of the particular fishing reel. The assembly 10 is ideal for handicapped fishermen in that it allows the handicapped fisherman to reel in the fishing line using only one hand. In addition, the assembly 10 is designed so that it can be overridden if the fisherman chooses to manually reel in the line using the handle assembly 30, whereupon he would need one hand to hold the rod 22 and the other free hand to reel in the line 20. In other words, the fisherman can use the handle assembly 30 freely without involving the assembly 10, but the assembly 10 allows the fisherman to bypass the use of the handle assembly 30. Also, as will be explained hereinafter, when the line 20 is being cast out, the assembly 10 must not be engaged. Furthermore, actuating the assembly 10 precludes using the handle assembly 30 to reel in the line 20. The assembly 10 may be bound up and damaged if the fisherman starts to reel in the line 20 by using the handle assembly 30 and then accidentally actuates the assembly 10.

Figure 2:
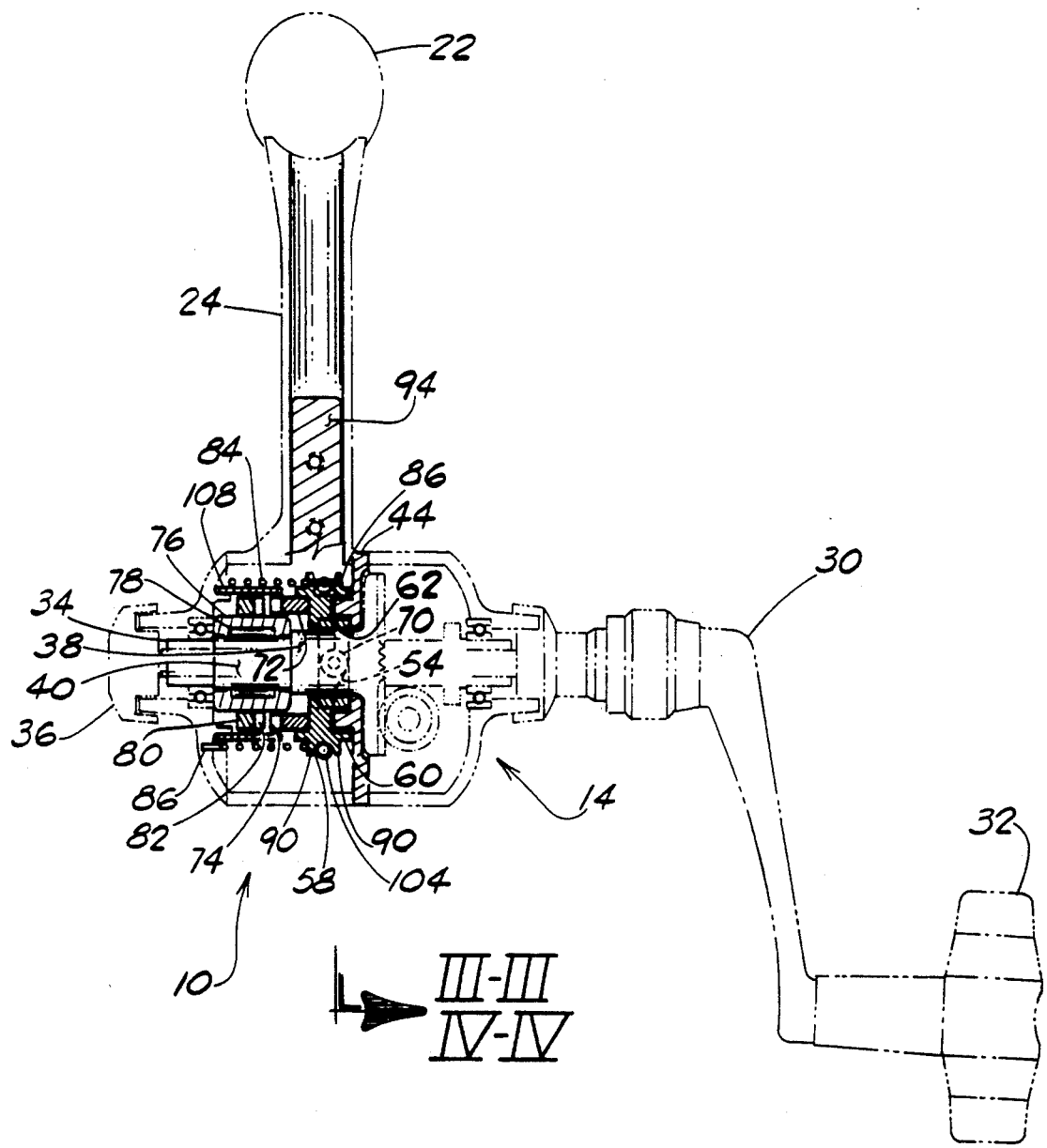
FIG. 2 is a cross-sectioned elevational view of the linear winding assembly first shown in FIG. 1.
Figure 3:
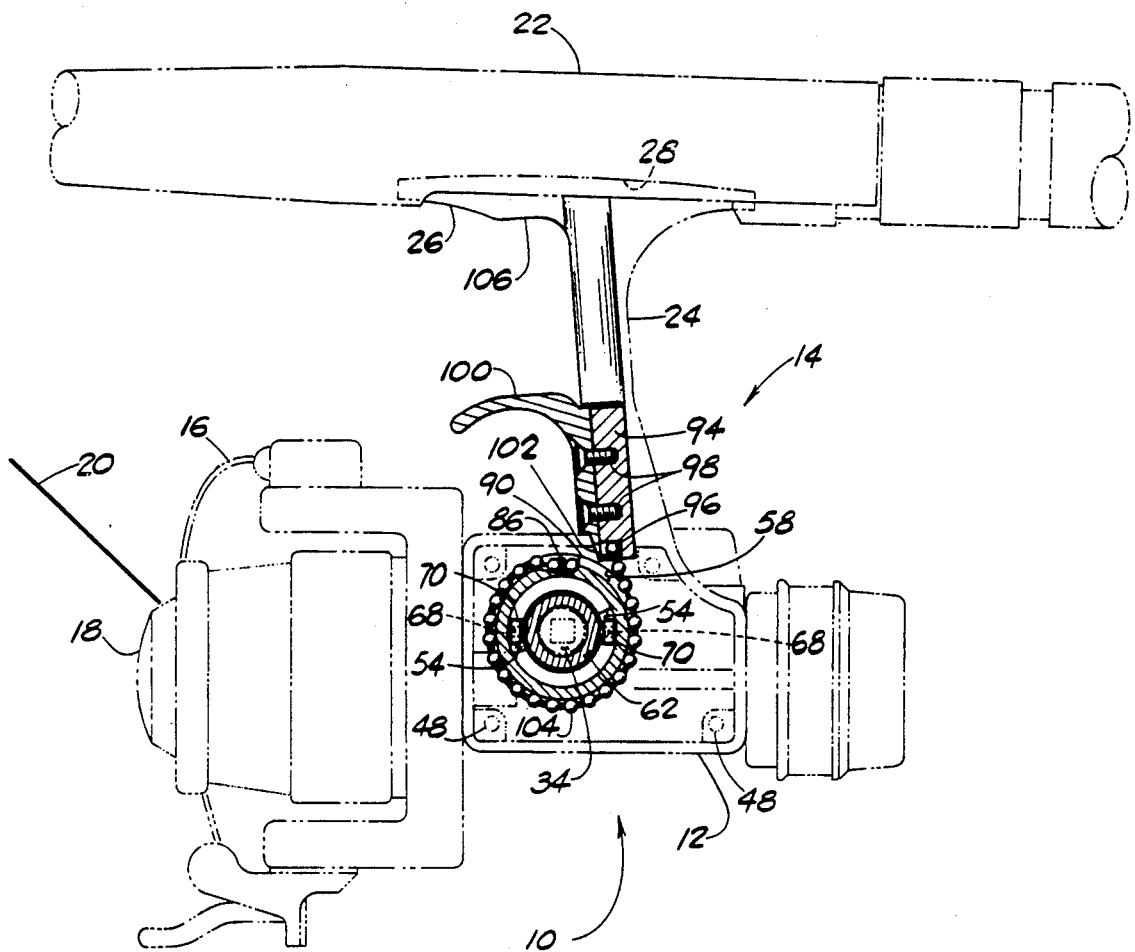
FIG. 3 is a view in cross-section of the linear winding assembly taken along Lines III—III of FIG. 2, showing the linear winding assembly in the disengaged, neutral position.

As shown in FIGS. 1–4, the housing 12 is rectangular-shaped. The housing 12 of each particular manufacturer may be of a slightly different design necessitating that the structural elements of the assembly 10 be adapted for that particular fishing reel housing or case. FIGS. 1 and 2 show a flat, generally rectangular-shaped clutch plate 44 for disposition within the housing 12. The clutch plate 44 is adapted to conform to the particular shape of the housing 12 (as shown in this embodiment, the housing is rectangular-shaped) and extends transverse to the main drive shaft 34. The clutch plate 44 has a first, or outer, side which faces the fishing reel drive gear and the oscillating gear, and an opposite inner side. The clutch plate 44 has a centrally disposed aperture 46 through which the shaft 311 is inserted and has at least four threaded bolt holes 48 located adjacent the periphery thereof for receiving securing bolts 50 which firmly attach the clutch plate 44 to the housing 12, as shown in FIG. 3. The clutch plate 44 includes a circular, upraised roller surface 52 which is integrally formed on the inner side thereof. The roller surface 52 circularly bounds the aperture 46 and is concentric with the shaft 34 when the plate 44 is disposed in its operative position. The roller surface 52 is further defined by having a pair of transitional ramps 54 which are spaced 180° from each other.

Referring to FIGS. 1–4, there is shown a cylindrical pulley housing 56 mounted on the shaft 34 concentrically thereto. The pulley housing 56 has a centrally located housing aperture through which the shaft 34 extends. The pulley housing 56 is adapted, as shall be described more fully hereinafter, for selective rotatable movement on the shaft 34, and also for selective linear movement thereupon the shaft 34 in conjunction with the rotatable movement. The pulley housing 56 also includes an annular chain track groove 58, whose purpose and function will be described hereinafter, and a circular pulley rim 60, which is integrally attached to and extends outwardly from the pulley housing 56. The rim 60 is located opposite the counterbore of the pulley housing 56. As shown in FIG. 1, the rim 60 will be concentric with the pulley housing 56, and when the pulley housing 56 is disposed in its operative position, the rim 60 will also encircle the shaft 34.

As shown in FIGS. 1–4, mounted within the pulley housing 56 and encompassed by the rim 60 is a cylindrical roller retainer 62. The retainer 62 has a smaller diameter than the rim 60 so that it can be pressed within the rim 60. When the retainer 62 is assembled to the pulley housing 56 by being press-fitted within the rim 60, both the retainer 62 and the pulley housing 56 are in axial alignment to each other, and are also concentrically aligned with the shaft 34. As shown in FIG. 1, the retainer 62 is a cylindrical object having an aperture for insertion on the shaft 34, and the retainer 62 may be constructed from metal, a powdered metal substance, or a plastic-coated metal, such as DELRON. The rim 60 circumjacently encompasses the retainer 62 when the retainer 62 is assembled and pressed into the pulley housing 56. As shown in FIG. 1, the pulley housing 56 also includes two half-circle, upraised interior shoulders 611 located within the rim 60 and integrally formed as part of the pulley housing 56 itself. The two shoulders 64 are separated by two roller clearance slots 66 which are spaced 180° from each other. Because the retainer 62 is pressed and assembled to the pulley housing 56, the retainer 62 rotates coincident with the selective rotation of the pulley housing 56.

As shown in FIG. 1, the retainer 62 includes a pair of oppositely-disposed axles 68 projecting or protruding outwardly from the retainer 62. The axles 68 are spaced 180° from each other and, when the retainer 62 is pressed into the rim 60, the axles 68 project into each respective slot 66. As shown in FIGS. 1-4, a roller means is mounted to the retainer 62 for rotating coincident with the rotation of the retainer 62. More specifically, the roller means includes a pair of cylindrical rollers 70, each mounted to one of the axles 68 on the retainer 62. The rollers 70 can be assembled and manufactured from die casting or a powdered metallurgy process. The rollers 70 are adapted for rotation upon the roller surface 52 concomitant with the rotation of the retainer 62. The rollers 70 are assembled to each respective axle 68 for a running and sliding fit which enables the rollers 70 to rotate and roll upon the roller surface 52 when the pulley housing 56 is engaged. The pulley housing 56 permits the rollers 70 to rotate freely and at the same time restricts the rollers 70 from coming off each axle 68 by having the rollers 70 entrained within each respective slot 66. Thus, the rollers 70 are maintained in each respective slot 66 when the assembly 10 is in the neutral or disengaged position. An adhesive material, such as the material known by the trade name LOCK TITE, can be used in the press-fitting of the retainer 62 into the rim 60 of the pulley housing 56. However, the rollers 70 must be rotatably assembled and fitted onto the axles 68 in order to permit their rotation upon the roller surface 52 when the pulley housing 56 is engaged. As shown in FIG. 2, when the retainer 62 is assembled within the rim 60, the pulley housing 56 is disposed on the shaft 34, and the retainer 62 is sandwiched or enclosed between the pulley housing 56 and the clutch plate 44. This sandwiching of the retainer 62 between the pulley housing 56 and the clutch plate 44 is necessary to present the roller surface 52 adjacent and proximate to the rollers 70.

FIGS. 1-4 illustrate a circular pulley gear 72 which is mounted to the pulley housing 56 in the counterbore of the pulley housing 56 opposite the location on the pulley housing 56 where the retainer 62 is mounted. When the pulley gear 72 is disposed in its operative position of being pressed into the counterbore of the pulley housing 56, the pulley gear 72 is concentric with the pulley housing 56 and the retainer 62 and' is axially aligned therewith. The pulley gear 72 also has a circular aperture. The pulley gear 72 is adapted for rotatable and linear movement about the shaft 34 concomitant with the rotation of the pulley housing 56 when the pulley housing 56 is engaged. As shown in FIG. 2 there is an annular clearance space or gap between the pulley gear 72 and the shaft 34. The pulley gear 72 has an annular arrangement of gear teeth 74 projecting opposite of the counterbore toward the far end of the shaft 34.

As illustrated in FIGS. 1-4, a cylindrical clutch bearing 76 is mounted to the shaft 34 adjacent the far end thereof. The clutch (or linear) bearing 76 is a one-way bearing which includes an inner bore comprising an annular arrangement of needle bearings 78. The needle bearings 78 are adapted to roll or rotate in one direction, while in the other direction they are adapted to wedge against the clutch bearing surface 40 of the shaft 34; the surface 40 of the shaft 34 being illustrated in FIG. 1. In order to prevent the clutch bearing 76 from moving longitudinally back and forth on the shaft 34, there will be placed on the shaft 34 either a shoulder, at the far end thereof, or a spacer, between the side cover 42 and the clutch bearing 76. The shoulder or the spacer will maintain the axial location of the bearing 76 on the shaft 34 and prevent the bearing 76 from sliding thereon.

When the assembly 10 is actuated and thus disposed in the engaged position, the bearing 76 will lock onto the shaft 34 for permitting rotatable motion of the shaft 34 in one direction only. Viewing the clutch bearing 76 from the side cover 42 and cap 36 end, the bearing 76 turns counterclockwise when the assembly 10 is engaged. However, it should be noted that when the assembly 10 is not engaged, turning the handle assembly 30 will only affect the shaft 34.

As illustrated in FIGS. 1-4, a driven gear 80 is mounted on the shaft 34 and is adapted for selective engagement by the pulley gear 72 for actuating rotation of the shaft 34 in order to take in the line 20. The driven gear 80 is positioned in adjacent linear alignment concentric with the pulley gear 72 on the shaft 34. Moreover, the driven gear 80 circumjacently and contiguously encompasses, and is fitted on, the cylindrical bearing 76. The driven gear 80 may be press-fitted onto the clutch bearing 76, and an adhesive, such as LOCK TITE, may be used to maintain the driven gear 80 on the clutch bearing 76. As shown in FIGS. 1 and 2, the driven gear 80 has a smaller width than the clutch bearing 76 and is positioned centrally onto the clutch bearing 76. The driven gear 80 also includes an annular arrangement of gear teeth 82. The teeth 82 on the driven gear 80 face the teeth 74 on the pulley gear 72, as shown in FIGS. 1 and 2, with a clearance space located between the opposed teeth 74 and 82. FIG. 2 shows the assembly 10 in the disengaged position whereby the teeth 74 of the pulley gear 72 and the teeth 82 of the driven gear 80 are not enmeshed.

The assembly 10 of the present invention, as shown in FIGS. 1-4, also includes an elongated torsion spring 84 having a tang, or first spring end 86, attached to the pulley housing 56 and a second spring end 88 attached to the housing 12 or the side cover 42. As shown in FIG. 1, the groove 58 on the pulley housing 56 is formed by a pair of annular projecting rims 90 spaced a slight distance from each other and encircling the outer surface of the pulley housing 56. Each rim 90 has a through-hole 92, and both through-holes 92 are axially aligned with each other. When the torsion spring 84 is disposed in its operative position, the first end 86 is inserted through both through-holes 92. As shown in FIG. 2, the torsion spring 84 is concentric with the shaft 34 and encompasses the bearing 76, the driven gear 80, and the pulley gear 72. The spring 84 may be given a half turn to preload when it is being assembled to the assembly 10. As shall be described more fully hereinafter, when the spring 84 is engaged, it will wind and tighten up, i.e., the spring 84 exhibits a torsion effect as it is being wound. At the same time the spring 84 will become more rigid. When the assembly 10 is disengaged, the energy stored in the spring 84 is released and the spring 84 unwinds, facilitating return of the assembly 10 to the neutral, non-rotating, disengaged position. When the assembly 10 is engaged, the spring 84 will facilitate and maintain contact between the pulley gear 72 and the driven gear 80, and when the assembly 10 is disengaged, the spring 84 will unwind and facilitate the disengagement of the pulley gear 72 from the driven gear 80.

Figure 4:
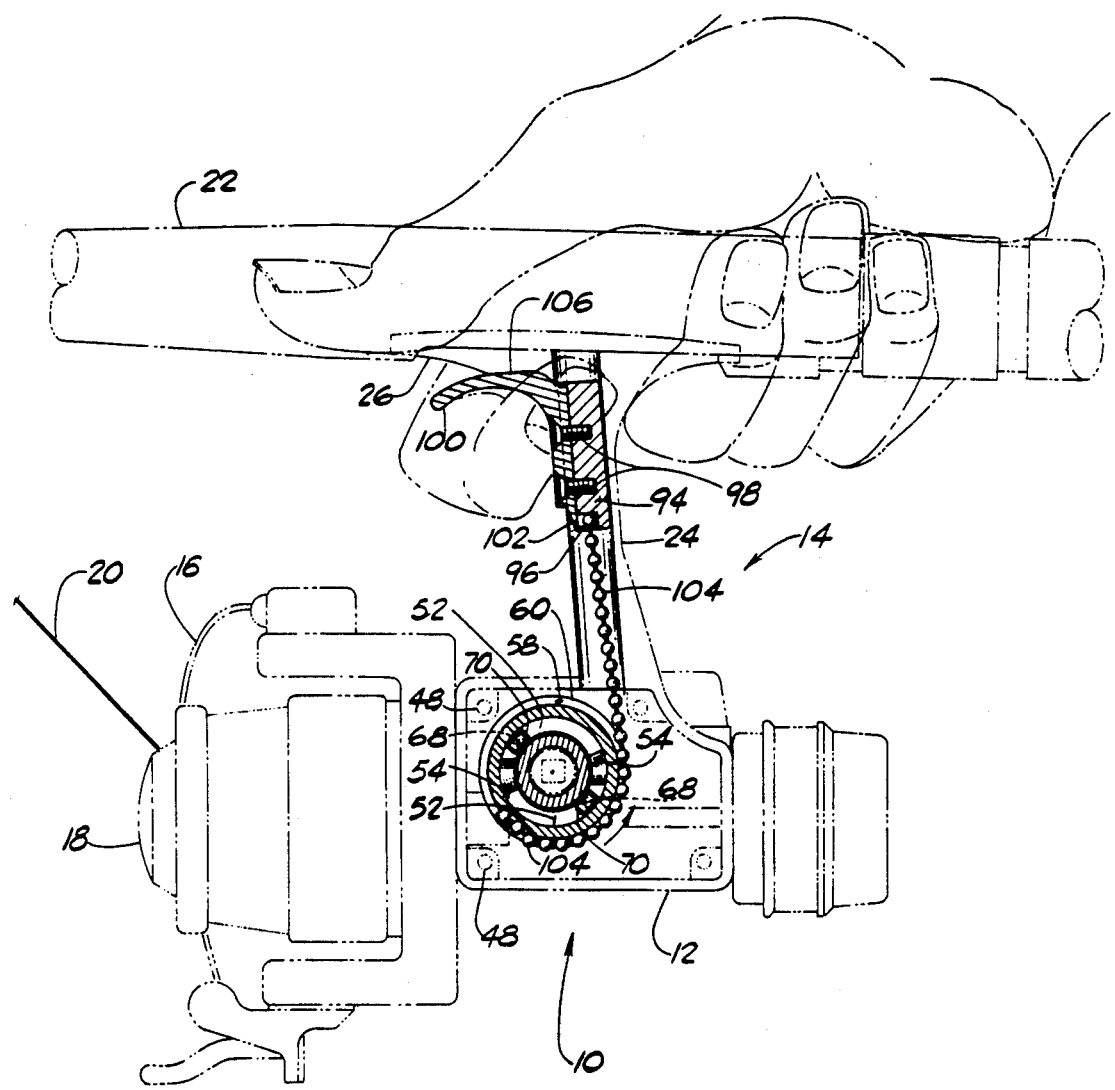
FIG. 4 is a view in cross-section of the linear winding assembly also taken along Lines III—III of FIG. 2, showing the linear winding assembly in the engaged position.

FIGS. 1-4 illustrate a slider member 94 which is slidably mounted to the stem 24 of the reel 14 and is adapted for reciprocal upward or downward movement therein. More specifically, the slider member 94 is a small, cylindrical piece adapted for slidable mounting within the stem 24 of the reel 14. The range of movement of the slider member 94 is essentially the length of the stem 24. At the lower end of the slider member 94 is a bead chain retainer pocket 96 whose purpose and function will be described hereinafter. Mounted to the slider member 94 by at least a pair of fasteners 98, such as screws, is a trigger 100. The trigger 100 is adapted for reciprocal upward and downward movement concomitant with the upward and downward movement of the slider member 94. As shown in FIGS. 1, 3, and 4, the trigger 100 projects toward the front of the reel 14; however, the trigger 100 and the slider member 94 can be disposed within the stem 24 so that the trigger 100 projects backward toward the fisherman. At the bottom of the trigger 100 is a bead chain retaining tab 102 which is disposed in front of, and closes off, the bead chain retainer pocket 96 when the trigger 100 is fixed to the slider member 94. FIGS. 3 and 4 illustrate how the retaining tab 102 closes off the retainer pocket 96.

When the fisherman pulls the trigger 100 upward, the pulley housing 56 is actuated for rotatable and linear movement with respect to the shaft 34. A connection means is necessary so that when the fisherman pulls the trigger 100 upward toward the rod 22, the pulley housing 56 will be rotatably actuated. In the present invention, the connection means connecting the trigger 100 and also the slider member 94 to the pulley housing 56 is a bead chain 104. The bead chain 104 includes a first end, mounted within the retainer pocket 96 and enclosed by the retaining tab 102, and a second end, which lays in the groove 58 of the pulley housing 56. When the spring 84 is disposed in its operative position, the first end 86 projects through both through-holes 92 on each annular pulley rim 90. At least one individual bead of the bead chain 104 is set within the pulley groove 58 and maintained within the pulley groove 58 by the projection of the tang of the spring 84 extending across the pulley groove 58. FIG. 2 illustrates how the tang of the spring 84 extends across the pulley groove 58 from one rim 90 to the other rim 90, and also how one bead of the bead chain 104 sets within the pulley groove 58. FIG. 3 shows the bead chain 104 disposed in its operative position with the substantial length of the bead chain 104 wrapped around the pulley housing 56 and located within the pulley groove 58. FIG. 4 shows the bead chain 104 in its extended position when the assembly 10 is in its engaged position. A single bead of the bead chain 104, located at the second end thereof, is disposed within the retainer pocket 96 and secured therein by the retaining tab 102 of the trigger 100. The upward movement of the trigger 100 pulls on the bead chain 104, actuating rotational and linear movement of the pulley housing 56. FIGS. 3 and 4 illustrate a stopping surface 106 which may be integrally formed from the flange member 26 or the stopping surface 106 may be integrally formed on the underside of the rod 22. The stopping surface 106 restricts the upward movement of the trigger 100.

In assembling the present invention, several variations for certain structural elements may be contemplated. As shown in FIG. 2, which is a view from the user end of the rod 22 looking outward, the handle assembly 30 may be transferred to the left-hand side of the housing 12. In addition, instead of utilizing rollers 70 affixed to the axles 68 of the roller retainer 62, pins may be used instead. The pins may be manufactured from plastic-coated metal and project out of the roller retainer 62 in the same place as the axles 68 of the present invention. However, there would be more wear using pins than using the rollers 70 of the present invention. It is also conceivable that the handle assembly 30 can be removed and yet the reel 14 may still be operable since the assembly 10 does not interfere with the casting out of the line 20. It is only necessary to have some means to bring in the line 20. The purpose of the assembly 10 is to allow the fisherman to bring in the line 20 while by-passing the handle assembly 30. Thus, it is conceivable that the entire handle assembly 30 can be removed and the reel 14 will still be operable. It should also be noted that in addition to limiting the upward movement of the trigger 100, the location of the stopping surface 106 and the length of the bead chain 104 prevents the rollers 70 from overrunning and going into the opposite slot 66.

As illustrated in FIG. 3, when the assembly 10 is in the neutral, disengaged position, the rollers 70 are entrained within each respective slot 66 and the bead chain 104 is substantially wrapped within the pulley groove 58. When the user pulls upward on the trigger 100, as illustrated in FIG. 4, the bead chain 104 unwinds and simultaneously actuates the rotational and linear movement of the pulley housing 56. This causes each roller 70 to move out of each respective slot 66 and roll along the roller surface 52. Because the full extension of the bead chain 104 is limited by the stopping surface 106 as well as the length of the stem 24 and the chain 104 itself, the rollers 70 can't rotate counterclockwise so far that they enter the next or opposite slot 66.

When the fisherman desires to take in the line 20 he simply pulls up on the trigger 100 as indicated in FIG. 3. The trigger 100 does not have to be pulled all the way up to the stopping surface 106 in order to cause the line 20 to be reeled in. The trigger 100 may include a pad or gripper teeth to increase the comfort for the finger and should be self-lubricating, if possible, to cut down on the friction caused by the continuous and reciprocable upward and downward movement of the trigger 100 during operation. The slider member 94 should also preferably be self-lubricating to reduce the friction caused by the reciprocable upward and downward movement of the slider member 94 within the stem 24. In place of the bead chain 104, a cable that is plastic-coated can also be used. However, the plastic-coated cable would be less flexible than the bead chain and would have a decreased useful lifespan. It should also be noted that clearances and tolerances should be given very careful consideration with respect to fitting the assembly 10 within the housing 12, and also in assembling the various structural components of the assembly 10 to the shaft 34. For example, the bearing 76 would have to fit standard main drive shafts as well as variations that may be of a thicker diameter.

In operation, the assembly 10 will begin from a neutral, disengaged position as shown in FIG. 3. When the fisherman desires to bring in the line 20, he simply pulls up on the trigger 100. As the trigger 100 is pulled upward by the fisherman, the bead chain 104 is also pulled upward in conjunction therewith, and because the bead chain 104 is wrapped around and attached to the pulley housing 56, the bead chain 104 actuates the rotational and linear movement of the pulley housing 56. Coincident with the trigger 100 being pulled upward and the bead chain 104 pulling on and actuating the rotational movement of the pulley housing 56 on the shaft 34, each roller 70 entrained in each respective slot 66 slips out of each slot 66 and rolls on the roller surface 52 and the shoulder 64 simultaneously pushing the housing 56 in a slight linear direction away from the clutch plate 44. Concomitant with the rotational movement of the pulley housing 56 is also the linear or longitudinal movement of the pulley housing 56. The linear or longitudinal movement of the pulley housing 56, with respect to its concentric positioning on the shaft 34, causes the pulley gear 72, which is fitted into the counterbore of the pulley housing 56, to move linearly toward the driven gear 80 so that the teeth 74 of the pulley gear 72 engage and are enmeshed with the oppositely facing teeth 82 of the driven gear 80. As shown in FIG. 2, the clearance space between the pulley gear 72 and the driven gear 80 when both are in the neutral, disengaged position may be 1/16 to ⅛ of an inch. Thus, the linear movement of the pulley housing 56 on the shaft 34 is a very short distance.

As shown in FIG. 1, the roller surface 52 includes two transitional ramps 54, spaced 180° apart. When the pulley housing 56 with the roller retainer 62 assembled and fitted therein is disposed in the operative position on the shaft 34 and the clutch plate 44 is disposed on the shaft 34 adjacent and generally in a spaced parallel relationship with the pulley housing 56, the cylindrical roller surface 52 fits within the annular flange 60 of the pulley housing 56. FIG. 2 shows one roller 70 set within its respective slot 66 and with a portion of the roller 70 partially abutting one of the transition ramps 54. When the trigger 100 is pulled upward and the pulley housing 56 begins to rotate, each roller 70 slips out of its respective slot 66, impinging and rolling upon each transitional ramp 54, and then rolling upon the roller surface 52. Standing on the left-hand side of the reel 14 and looking toward the housing 56, the rotation of the pulley housing 56, the roller retainer 62, and the rollers 70 is counterclockwise, as shown in FIGS. 3 and 4. Because the roller surface 52 is disposed within the flange 60 of the pulley housing 56, when the rollers 70 slip out of the slots 66 onto the roller surface 52, this actually causes the pulley housing 56 to be pushed very slightly in the linear direction toward the far end of the shaft 34 and away from the clutch plate 44. The amount of linear displacement of the pulley housing 56 is enough to cause the engagement of the driven gear 80 by the pulley gear 72.

Simultaneously occurring with the rotation of the pulley housing 56 and its linear movement on the shaft 34 which brings the pulley gear 72 into engagement with the driven gear 80 is the winding of the torsion spring 84. The spring 84 performs two functions: (1) maintains the linear contact of the pulley gear 72 with the driven gear 80 when the pulley housing 56 is rotatably and linearly actuated; and (2) allows for the unwinding and recoiling of the assembly 10 to the neutral position so that the assembly 10 can be instantly reused. As soon as the fisherman pulls upward on the trigger 100 with his finger, the pulley housing 56 is rotatably and linearly actuated and there is a concomitant and near instantaneous engagement of the driven gear 80 by the pulley gear 72. The linear bearing 76 thus locks onto the shaft 34 causing the shaft 34 to be rotated in the counterclockwise direction, as shown in FIG. 4. The handle assembly 30 of the reel 14 will rotate and the line 20 will be reeled in.

FIG. 4 shows the trigger 100 abutting the stopping surface 106 as well as the maximum extension of the bead chain 104 and the extent to which the rollers 70 have slipped out of each respective slot 66 and rolled upon the roller surface 52 of the clutch plate 44. In order to continually bring in the line 20, the fisherman will release his finger from the trigger 100. As soon as this occurs, the energy stored within the spring 84 as a result of its being wound by the upward movement of the trigger 100 and the rotation of the pulley housing 56 is then released. As the spring 84 rapidly unwinds, it forces the pulley gear 72 to disengage from the driven gear 80 while at the same time causing the trigger 100 to slidably move downward in the stem 24 to the position shown in FIG. 3. The unwinding and recoiling of the spring 84 due to the release of the trigger 100 causes the pulley housing 56 to rotate clockwise, thus returning the rollers 70 into their respective slots 66. A cylindrical sleeve 108, either pressed into or unitized to the side cover 42, provides a surface on which the spring 84 can ride and prevents the spring 84 from interfering with the pulley gear 72 and the driven gear 80. The unwinding of the spring 84 also rewraps a substantial portion of the bead chain 104 into the groove 58 on the pulley housing 56. The action of the spring 84 unwinding tends to push the pulley gear 72 linearly away from the driven gear 80, automatically and instantaneously disengaging the pulley gear 72 from the driven gear 80. When the spring 84 has fully unwound and returned to its disengaged or neutral position, the assembly 10 will be in the state shown in FIG. 3. The fisherman can then immediately pull up on the trigger 100 thus actuating the rotatable and linear movement of the pulley housing 56 and causing the bearing 76 to lock onto and rotate the shaft 34. Another length of the line 20 will then be brought in. The fisherman will continue pulling up on the trigger 100 and releasing his finger from the trigger 100 until the line 20 is completely brought in so that he can cast out again or remove his catch.

Illustrated in FIGS. 5-8 is an alternate preferred embodiment for a linear winding assembly device 110. The device 110, as shown in FIGS. 5-8, is disposed within a housing 112 of a fishing reel 114 for actuation from a neutral, disengaged position to an engaged position for reeling in a line 116 of the reel 114. Many of the same considerations relating to the preferred embodiment will also relate to the alternate embodiment of the device 110. The device 110 will have to be shaped and manufactured to fit a variety of differently shaped housings and a variety of different main drive shafts. The device 110 includes a cylindrical pulley member 118 mounted on a main drive shaft 120 and adapted for selective rotation thereabout the shaft 120 in order to actuate the reeling in of the line 116. The pulley member 118 circumjacently rests upon the shaft 120 wherein the member 118 is in the disengaged, neutral position and the member 118 rotates about the shaft 120 when it is engaged. In the neutral position, the pulley member 118 is concentric to the shaft 120, and further, the pulley member 118 includes an annular pulley member groove 122.

Figure 7:
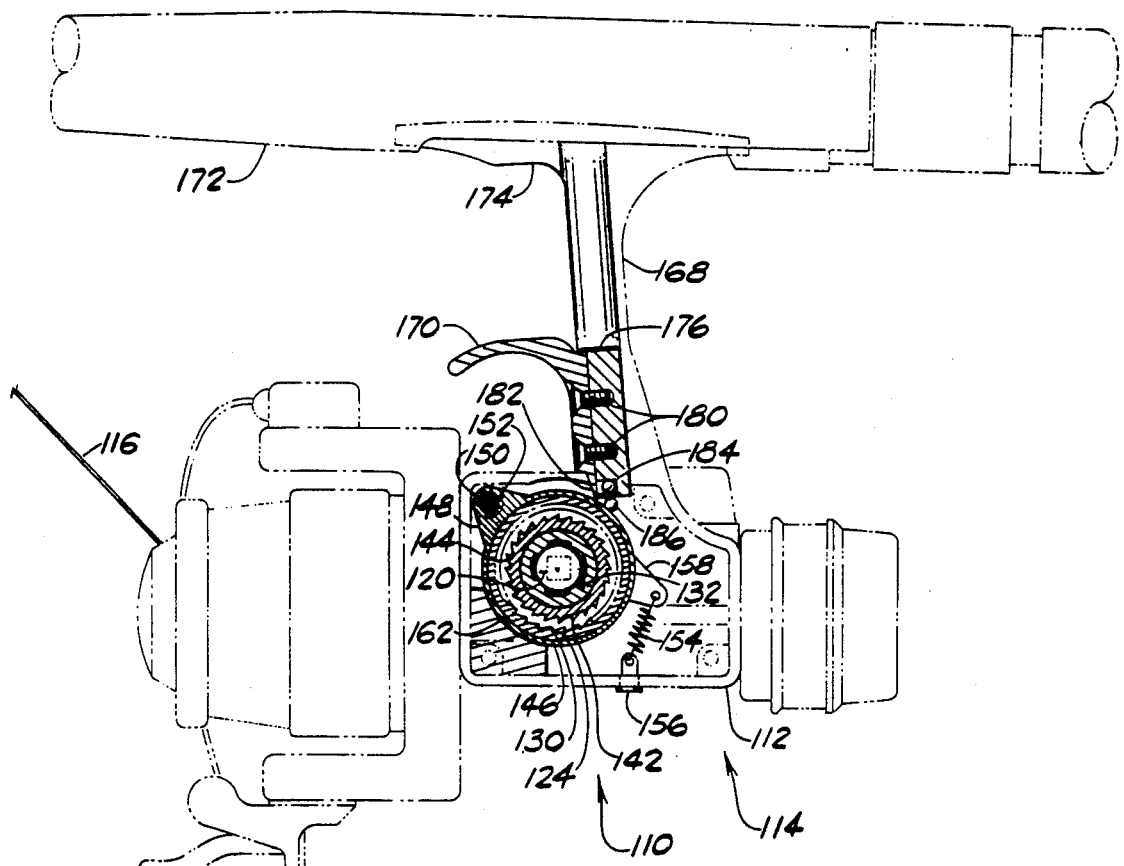
FIG. 7 is a view in cross-section of the device taken along Lines VI—VI of FIG. 6 showing the device in the disengaged, neutral position.
Figure 8:
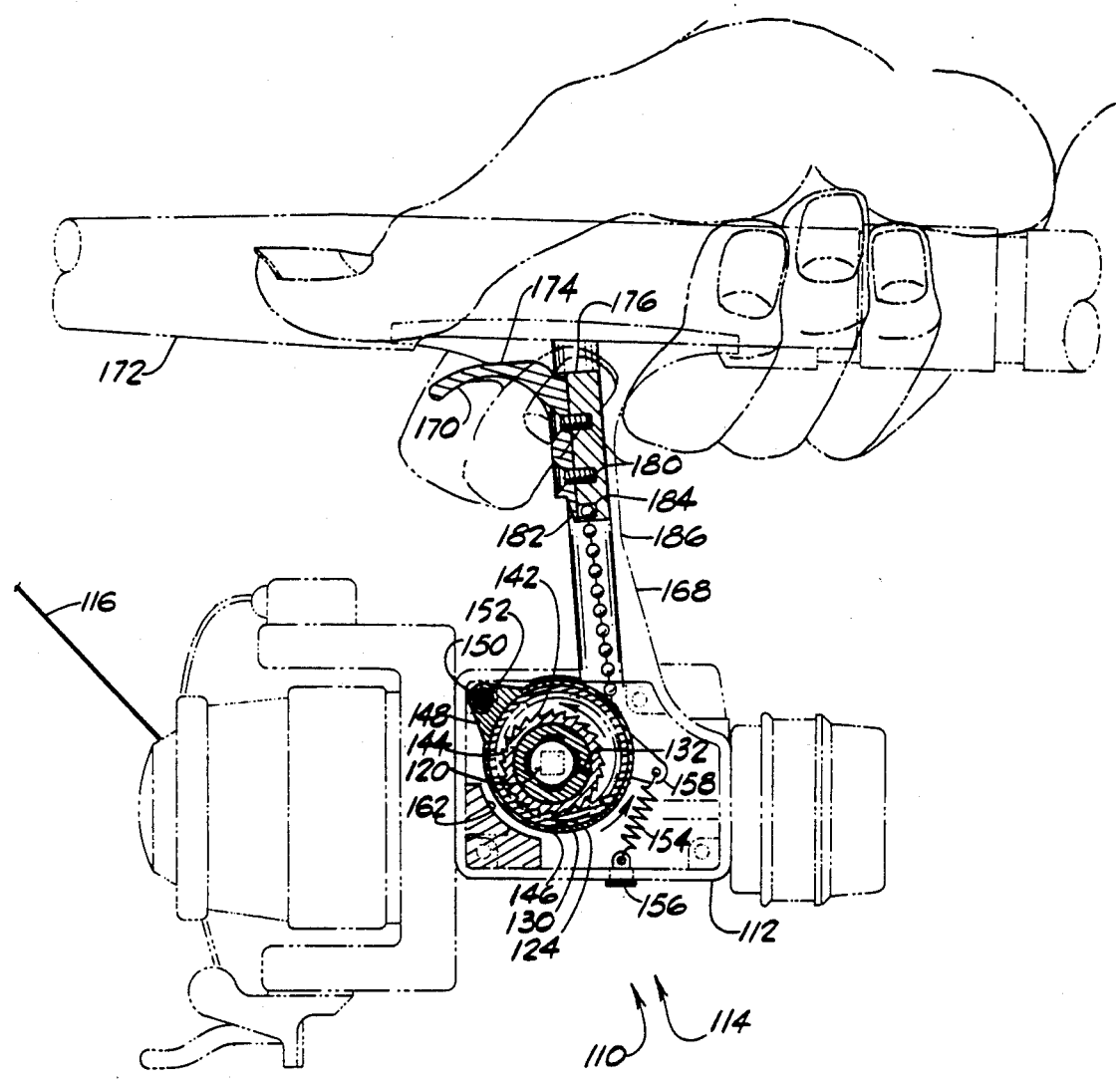
FIG. 8 is a view in cross-section of the device also taken along Lines VI—VI of FIG. 6 showing the device in the engaged state.

Assembled and press-fitted to the pulley member 118 is a cylindrical drive gear 124 which has a slightly larger diameter than the pulley member 118. The pulley member 118 and gear 124 may also be molded and formed as a one-piece unit. The drive gear 124 is fitted to the pulley member 118 and is concentrically aligned therewith and is rotatable concomitant with the rotation of the pulley member 118. When the drive gear 124 is in its neutral, disengaged position on the shaft 120, the drive gear 124 is axially aligned to the shaft 120. On the annular surface portion of the drive gear 124, opposite that portion of the drive gear 124 which is fitted to the pulley member 118, is an annular upraised flange 126. The flange 126 includes a main spring hole 128 which extends through the flange 126. When the drive gear 124 is in its disengaged position, the hole 128 will be positioned toward the upper portion of the housing 112. When assembling the drive gear 124 to the pulley member 118, any of various adhesives can be used which provide a firm, moisture-free, tight fitting adhesion of the two elements together. Located on the inside diameter of the drive gear 124 are a plurality of annularly-spaced drive gear teeth 130. As shown in FIGS. 7 and 8 the teeth 130 are angled to provide for a good contact surface and to facilitate their engagement to other structural elements which will be hereinafter further described. The teeth 130 may be manufactured from die-cast metals, powdered metals, or even ceramic-type material. When the drive gear 124 is rotatably actuated as a consequence of the rotatable actuation of the pulley member 118, the teeth 130 will simultaneously grip and compress.

Figure 5:
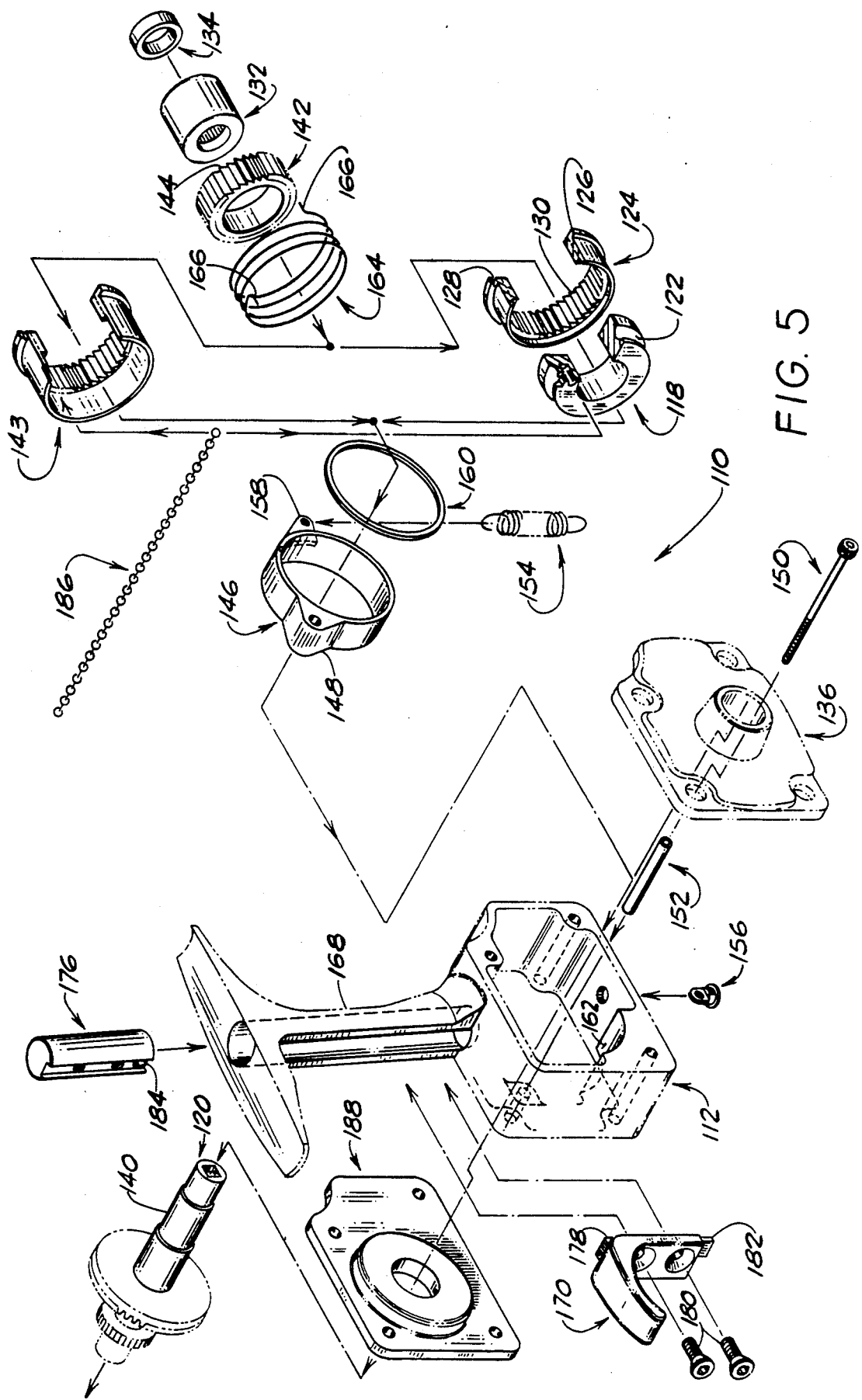
FIG. 5 is an exploded isometric view of an alternate embodiment of the linear winding assembly device.
Figure 6:
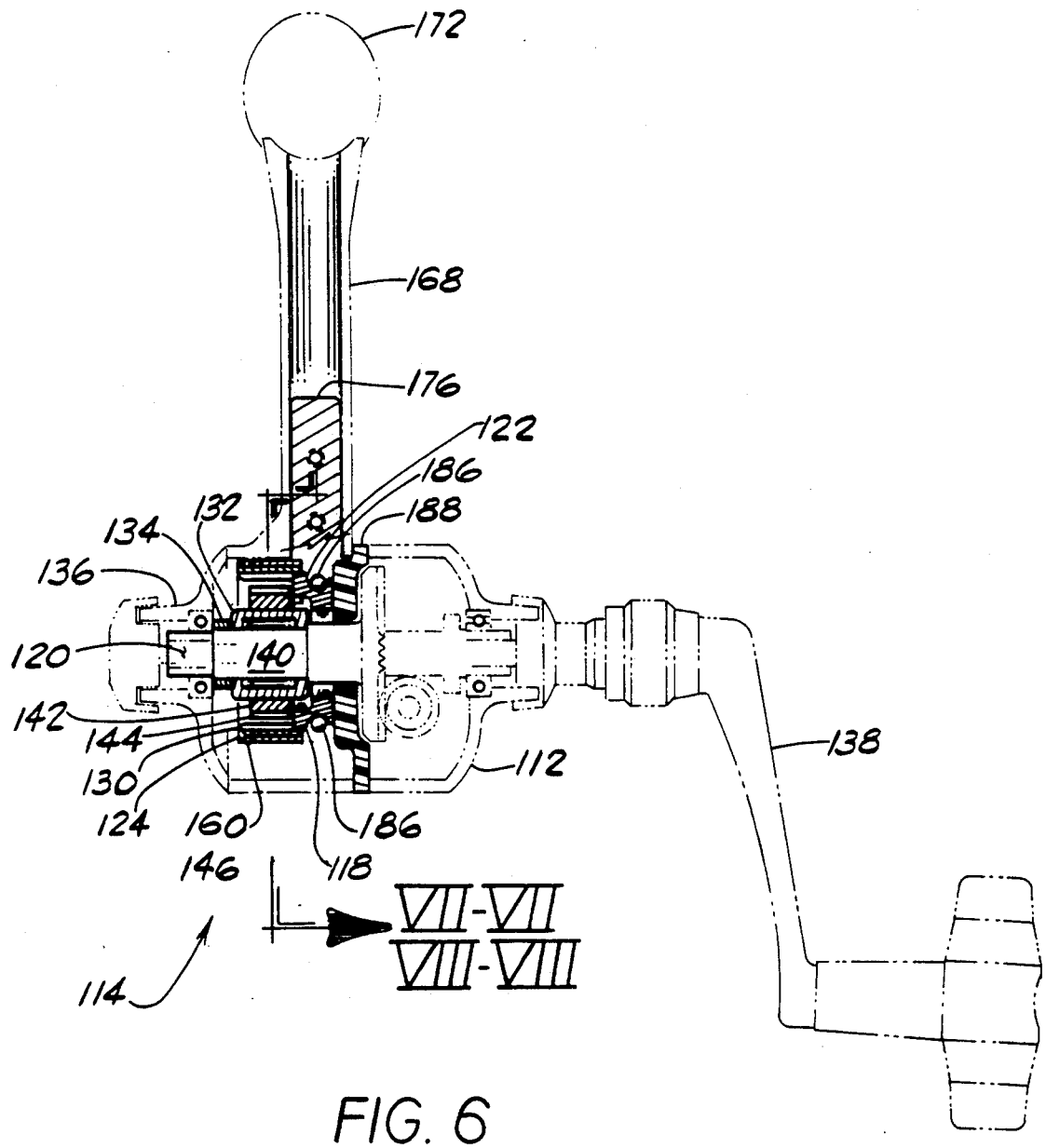
FIG. 6 is a cross-sectioned elevational view of the device first shown in FIG. 5.

FIGS. 5-8 illustrate a clutch bearing 132 which is mounted to the shaft 120 and is adapted to lock onto and rotate the shaft 120 when disposed in its engaged position. The bearing 132 of the alternate embodiment shown in FIGS. 5-8 is similar, if not of the same type as, the bearing 76 illustrated in the preferred embodiment shown in FIGS. 1-4. When disposed in its operative position, the bearing 132 is concentric with the shaft 120. In order to prevent the bearing 132 from sliding upon the shaft 120, a cylindrical spacer 134 is inserted on the shaft 120 at the far end thereof. The spacer 134 is contiguous with and concentric to the bearing 132 and abuts either the flat interior surface of the housing 112 which extends transverse to the shaft 120, or a flat end plate 136, or side cover, which is disposed on the shaft 120 and extends transverse thereto. The plate 136 is disposed on the far end of the shaft 120 and within the housing 112 of the reel 114. As shown in FIG. 6, the spacer 134 abuts the bearing 132 and the flat transversely-extending portion of the interior housing 112. When the bearing 132 is in its disengaged, neutral position, the fisherman can turn the handle 138 and the bearing 132 will not interfere with the rotation of the shaft 120. However, when the bearing 132 is actuated and engaged, the bearing 132 wedges and locks against the surface of the shaft 120 or a clutch bearing surface 140. When the bearing 132 is in its engaged position, it allows rotation of the shaft 120 in one direction; this counterclockwise rotation, as shown in FIG. 7, will cause the line 116 to be reeled in, as shall be more fully described hereinafter.

The device 110 also includes a driven gear 142 which is mounted on the shaft 120 and is concentric thereto. More specifically, the driven gear 142 circumjacently encompasses and is fitted to the bearing 132, as shown in FIG. 6. The driven gear 142 is adapted for selective rotatable engagement by the drive gear 124. An adhesive, such as LOCK TITE, can be used to assemble the driven gear 142 to the bearing 132. The inside diameter of the driven gear 142 will be just large enough to allow the driven gear 142 to be securely mounted on the outer surface of the bearing 132, as shown in FIG. 6. The outer annular surface of the driven gear 142 will be comprised of a plurality of driven gear teeth 144. As shown in FIGS. 7 and 8, the teeth 144 will project in a direction counter to the projection of the teeth 130, and it should also be noted that the number of teeth 130 will exceed the number of teeth 144 because the circumference of the inner annular surface of the drive gear 124 is greater than the circumference of the outer annular surface of the driven gear 142. However, the teeth 130 and 144 will be of the same size so as to allow proper meshing and engagement when the device 110 is actuated. When the drive gear 124 and the driven gear 142 are in their disengaged, neutral positions, there will be a circumferential gap or clearance space between the teeth 130 and the teeth 144. Moreover, the driven gear 142 will be circumjacently encompassed by the drive gear 124 and it will also be concentric with the drive gear 124. As a alternative to using the pulley member 118 and the drive gear 124, the structure indicated by reference number 143 can be utilized instead. The combination pulley member and drive gear 143 shown in FIG. 5 would be easier to mold or fabricate than the pulley member 118 and drive gear 124, both of which are shown in FIG. 5 as separate pieces.

In order to facilitate engagement and disengagement of the device 110 upon the shaft 120, the device 110 includes a housing means which substantially encompasses the bearing 132, the driven gear 142, and the drive gear 124, and which is assembled and fitted onto the drive gear 124. The housing means of the alternate preferred embodiment is a cylindrical gear housing 146 which is pivotally mounted within the interior of the housing 112 and circumjacently encompasses the drive gear 124, the driven gear 142, and the clutch bearing 132. The gear housing 146 is adapted to pivot within the housing 112 in conjunction with the rotatable engagement of the pulley member 118. The gear housing 146 facilitates the engagement of the driven gear 142 by the drive gear 124 so that the line 116 may be taken in. The gear housing includes an upraised, generally triangular-shaped member 148 having a through-hole. One of the existing bolts 150 that is used to fasten the housing 112 together will be inserted into the through-hole when the gear housing 146 is assembled into the interior of the housing 112. The length of the bolt 150 will allow the gear housing 146 to pivot thereon when the device 110 is engaged. Since all of the elements of the device 110 will have to be assembled onto the shaft 120 before the housing 112 is closed and bolted together, a cylindrical, elongated, hollow axle pin 152 is provided to facilitate the alignment and securement of each bolt 150. Generally, housings 112 come with four side cover screws or bolts which fasten the side cover to the housing 112. In order to restrict the range of pivot of the gear housing 146 when the device 110 is actuated, an auxiliary return spring 154 is provided. An auxiliary spring end retainer 156 is mounted into and projects up through the floor of the housing 112 and a first end of the spring 154 is secured to the retainer 156. A second end of the spring 154 is attached to a side projecting member 158 integrally formed on and extending laterally from the gear housing 146. The side member 158 has a through-hole to receive the end or tang of the second end of the spring 154.

FIGS. 7 and 8 show the disposition of the retainer 156, the spring 154, and the side member 158, in both their disengaged, neutral position and also their engaged position. FIG. 5 illustrates a cylindrical TEFLON liner 160 or bearing which is adapted to fit onto the outer surface of the drive gear 124 and abutting the flange 126. The liner 160 is pressed onto the drive gear 124 and provides a slidable surface for the gear housing 146 to ride upon when the pulley member 118 and the drive gear 124 are rotatably actuated. When the device 110 is assembled, the gear housing 146 will circumjacently encompass the drive gear 124 and abut the liner 160 disposed between it and the flange 126. The interior of the housing 112 is provided with a stopping surface 162 which is used to restrict the pivoting of the gear housing 146 when it is engaged and then disengaged. The stopping surface 162 also provides a surface upon which a portion of the gear housing 146 can abut and rest when the gear housing 146 is in the neutral, disengaged position, as shown in FIG. 7. The stopping surface 162 may be integrally formed from the interior of the housing 112 or it may be secured thereto; the stopping surface 162 includes a concave portion upon which a portion of the outer cylindrical surface of the gear housing 146 can rest.

The device 110 also includes a disengaging means for disengaging the drive gear 124 from its meshed engagement with the driven gear 142 in order to return the device 110 to the neutral, disengaged position. More specifically, a cylindrical torsion spring 164 is utilized to facilitate the engagement and disengagement of the device 110. The spring 164 has the same general diameter as the drive gear 124 and encompasses the shaft 120. The spring 164 has a spring tang end 166 which is fitted into the main spring hole 128 on the flange 126 of the drive gear 124 and the spring 164 includes a second end which is secured to the interior of the housing 112 opposite the drive gear 124 or a side cover 136 located at the far end of the shaft 120 and extending transverse thereto.

The spring 164 in the alternate embodiment functions in the same way as the torsion spring 84 in the preferred embodiment. When the device 110 is engaged, the spring 164 tends to tighten up. Before being assembled completely, the spring 164 may be given a half turn to preload. The spring 164 exhibits a torsion effect as it is engaged and also becomes more rigid. When the device 110 is disengaged, the energy stored within the spring 164 as a result of its being wound and tightened is then released. The unwinding or uncoiling of the spring 164 thus facilitates the disengagement of the device 110 to the neutral position.

The device 110 shown in FIGS. 5-8 also includes a trigger engagement means for initiating rotation of the pulley member 118. The trigger engagement means is disposed within the stem 168 of the reel 114 and is connected to and rotatably actuates the pulley member 118. More specifically, the trigger engagement means includes a trigger member 170 adapted for reciprocable and slidable upward and downward movement within the stem 168 of the reel 114. The trigger member 170 can be disposed in the stem 168 so that it projects forwardly toward the front of the rod 172, or it can be disposed in the stem 168 so it projects rearwardly toward the fisherman and the back end of the rod 172. The alternate embodiment also includes a stopping surface 174 which is part of the stem 168 of the reel 114. The stopping surface 174 limits the upward movement of the trigger member 170 and also provides, if desired, a cushioning surface upon which the trigger member 170 can abut when it is pulled upward. FIG. 7 shows the position of the trigger member 170 when it is in its disengaged, neutral position; FIG. 8 shows the location of the trigger member 170 when it is in the fully engaged position.

In order to slidably mount the trigger member 170 to the stem 168, the trigger engagement means also includes a cylindrical slider member 176 which is slidably mounted within the stem 168 of the reel 114 and is adapted for reciprocable upward and downward movement therein. As shown in FIG. 5, the slider member 176 is cylindrical and elongated in shape and is adapted to fit wholly within the stem 168. The slider member 176 has an elongated recess or groove which is adapted to receive an elongated mounting member 178 integrally formed on the back of the trigger member 170. The slider member 176 includes at least a pair of spaced-apart receiving holes and the trigger member 170 also includes at least a pair of spaced-apart screw holes, the screw holes of the trigger member 170 aligning with the receiving holes of the slider member 176 for attaching the trigger member 170 to the slider member 176 by using fasteners 180, such as metal or plastic screws. The trigger member 170 includes a bead chain retaining tab 182 which projects downwardly toward the housing 112. Located at the bottom of the slider member 176 is a bead chain retainer pocket 184. When the fisherman pulls upward on the trigger member 170 for engaging the device 110, the slider member 176 is simultaneously pulled upward in conjunction therewith. When the fisherman releases the trigger member 170 for disengaging the device 110, both the trigger member 170 and the slider member 176 move simultaneously downward toward the housing 112.

In order for the trigger member 170 to actuate the pulley member 118 for rotatable movement about the shaft 120, a connection means must be employed which drivingly connects the trigger member 170 to the pulley member 118. As shown in FIGS. 5-8, the connection means is a bead chain 186. The bead chain 186 has a first end which is attached to the trigger member 170. As shown in FIG. 8, a single bead is placed within the bead chain retainer pocket 184 and enclosed or sandwiched therein by the retaining tab 182 of the trigger member 170. The retaining pocket 184 is just large enough to accommodate the bead which is tightly pressed therein. The second end of the bead chain 186 is connected to the pulley member 118. The pulley member 118 includes a recessed pocket 188 on its outer annular groove 122 which is adapted to receive at least one bead at the second end of the bead chain 186. This bead is tightly pressed into the pocket 188. When disposed in its neutral position as shown in FIG. 7, the bead chain 186 is substantially wound around the pulley member 118 in the groove 122. When the fisherman pulls upward on the trigger member 170 for engaging the device 110, as shown in FIGS. 7 and 8, this causes the bead chain 186 to unwind and rotate the pulley member 118 along with the other structural elements fitted within the pulley member 118. As the bead chain 186 rotates and unwraps causing the rotation of the pulley member 118, the gear housing 146 is pivoted from its normal position of resting against the stopping surface 162 when in the disengaged state to a position away from the surface 162 and eccentric to the shaft 120.

As shown in FIG. 6, when the device 110 is fully assembled within the housing 112 and on the shaft 120, the structural elements of the device 110 are concentric thereto and compactly arranged. Forming what could be described as a concentric and radial configuration the bearing 132 is mounted directly to the shaft 120 for locking onto when engaged, the driven gear 142 is press-fitted and circumjacently encompasses the bearing 132, and the drive gear 124 circumjacently encompasses the driven gear 142 and the bearing 132 with allowance for clearance between the driven gear teeth 144 and the drive gear teeth 130. The drive gear 124 is press-fitted to the pulley member 118 which is mounted upon the shaft 120. The gear housing 146 then circumjacently encompasses both the drive gear 124 and the driven gear 142, as well as a substantial portion of the bearing 132. The gear housing 146 is not press-fitted to the drive gear 124 but is fitted upon the drive gear 124 so as to allow the drive gear 124 to rotate in conjunction and concomitant with the rotation of the pulley member 118. A backing plate 188, similar to the clutch plate 44 but lacking the roller surface 52 and the transitional ramps 54 of the preferred embodiment, is placed on the shaft 120 transverse thereto. The plate 188 provides a surface upon which the pulley member 118 can slide and rotate, and the plate 188 extends the length and height of the interior of the housing 112. Because the main structural elements of the device 110 are compactly assembled, the torsion spring 164 is axially aligned with the gear housing 146 and the pulley member 118 but does not encircle or encompass the aforesaid elements. This compact arrangement makes for a one-piece unit that can be easily removed from the shaft 120 if maintenance is required.

In operation, the device 110 will first be in the disengaged, neutral position as shown in FIG. 7. When the fisherman desires to bring in the line 116, he pulls upward on the trigger member 170. This upward movement of the trigger member 170 causes the bead chain 186 to unwrap as it is pulled upward, thus causing the rotation of the pulley member 118. Concomitant with the rotatable actuation of the pulley member 118 is the slight pivotal movement of the gear housing 146. Two actions are occurring at the same time, in effect: the pulley member 118 is being rotated which causes the drive gear 124 to also rotate; and the pivoting of the gear housing 146 slightly displaces the drive gear 124 from its concentric positioning on the shaft 120. So that the drive gear teeth 130 can engage, mesh with and rotate the driven gear teeth 142. Although these actions are being described seriatim, they actually occur simultaneously as soon as the fisherman pulls upward on the trigger member 170.

In addition, as the foregoing events are occurring, the torsion spring 164 is being wound from its neutral, disengaged position to its engaged position which is reached when the trigger member 170 is pulled upward by the fisherman to abut the stopping surface 174. Because the driven gear 142 is press-fitted to the bearing 132, rotation of the driven gear 142 by the drive gear 124 also causes the bearing 132 to rotate and wedge against and lock onto the clutch bearing surface 140 of the shaft 120. This causes the shaft 120 to rotate in a counterclockwise direction and such rotation causes the line 116 to be brought in. FIG. 8 shows the position of the trigger member 170, the bead chain 186, the gear housing 146, the extension of the auxiliary return spring 154, and the meshed engagement of the drive gear teeth 130 with the driven gear teeth 144 when the device 110 is in its fully engaged position. The winding and coiling of the torsion spring 164 maintains the contact between the drive gear teeth 130 and the driven gear teeth 144.

When the fisherman releases the trigger member 170, the torsion spring 164 disengages by, in effect, releasing the stored energy due to the winding and coiling thereof as a result of the spring 164 being brought to the engaged position. As the spring 164 disengages by unwinding and uncoiling, the drive gear teeth 130 are disengaged from the driven gear teeth 144. The unwinding and disengaging of the spring 164 causes the trigger member 170 to be pulled downward toward the housing 112 due to the clockwise rotation of the pulley member 118. The bead chain 186 is quickly rewrapped into the groove 122 of the pulley member 118 and the gear housing 146 pivots back so that a portion of the gear housing 146 abuts and rests against the stopping surface 162. The auxiliary return spring 154 also facilitates the return of the gear housing 146 to the neutral position by restricting its range of pivot when the housing 146 is fully engaged and by pulling downward on the gear housing 146 when the trigger 170 is released. When the spring 164 fully unwinds and disengages, the device 110 will again be in the neutral, disengaged position as shown in FIG. 7. A length of the line 116 will have been brought in. The fisherman can then pull upward on the trigger member 170 to bring in another length of the line 116, and this can continue until the line 116 is brought in to either change the bait or remove the catch. Thus, the device 110 can be continually used without the need to reset or preset any levers or springs, etc.

While a preferred embodiment and an alternate embodiment are herein disclosed, it is to be clearly understood that the invention is not to be limited to the exact constructions, mechanisms, and devices illustrated and described because various modifications of these details may be provided in putting the invention into practice.

I claim:

1. A linear winding assembly installed within a fishing reel housing which is attached to a fishing rod by a stem, wherein the linear winding assembly is actuated by a user from a neutral position to an engaged position to rotate a main drive shaft which actuates a bail assembly, causing the line to be brought in, comprising:

a slider member slidably mounted to the stem of the reel and actuated for selective reciprocable upward and downward movement thereon;

a trigger mounted to the slider member and actuated by the user for reciprocable upward and downward movement;

a cylindrical pulley housing mounted on the main drive shaft and actuated by the reciprocable upward and downward movement of the trigger for rotatable and linear movement on the main drive shaft;

connection means for connecting the pulley housing to the slider member so that the upward movement of the trigger member actuates the pulley housing for rotatable and linear movement on the main drive shaft;

a circular pulley gear mounted within the pulley housing thereto, whereby the pulley gear moves in a rotatable and linear manner on the main drive shaft concomitant with the selective rotation of the pulley housing;

a driven gear mounted on the main drive shaft adjacent the pulley gear and which is selectively engaged by the pulley gear for actuating main drive shaft rotation, the driven gear in adjacent linear alignment concentric with the pulley gear; and a cylindrical bearing mounted on the main drive shaft and circumjacently encompassed by and fitted within the driven gear whereby the bearing is capable of locking onto the main drive shaft for permitting one-direction rotation of the main drive shaft for bringing in the fishing line when the driven gear is actuated by the pulley gear.

2. The winding assembly of claim 1 further comprising a cylindrical roller retainer having a smaller diameter than the pulley housing and mounted within the pulley housing in axial alignment therewith so that the roller retainer rotates coincident with the rotation of the pulley housing and facilitates the rotatable and linear movement of the pulley housing.

3. The winding assembly of claim 2 further comprising roller means mounted to the roller retainer which rotates coincident with the rotation of the roller retainer and facilitates the rotation of the pulley housing on the main drive shaft.

4. The winding assembly of claim 3 further comprising a flat clutch plate disposed within the housing transverse to the drive shaft, the clutch plate positioned adjacent and parallel to the pulley housing for enclosing therebetween the roller retainer and against which the roller means pushes.

5. The winding assembly of claim 4 wherein the clutch plate further includes a circular, upraised roller surface formed thereon which is in axial alignment with the pulley housing and opposite the roller retainer, the roller surface being the surface against which the roller means rotates and pushes when the pulley housing is rotatably engaged by the trigger.

6. The winding assembly of claim 5 wherein the roller means includes a pair of rollers mounted to the roller retainer and spaced 180° from each other so that the rollers rotate upon and push against the roller surface coincident with the rotation of the roller retainer.

7. The winding assembly of claim 1 wherein the connection means includes a bead chain having a first end mounted in the slider member and a second end secured to the pulley housing with a substantial length of the bead chain being wrapped around the pulley housing.

8. The winding assembly of claim 1 wherein the pulley housing includes an annular chain track groove for receiving the bead chain.

9. The winding assembly of claim 1 further comprising a torsion spring having a first spring end attached to the pulley housing and a second spring end attached to the fishing reel housing, the torsion spring concentric with the main shaft and encompassing the pulley gear, the driven gear, and the clutch bearing.

10. The winding assembly of claim 9 wherein the torsion spring winds and maintains contact between the pulley gear and the driven gear when the pulley housing is rotatably actuated by the upward movement of the trigger, and disengages the pulley gear from the driven gear by unwinding when the trigger is released and thus returns the pulley housing to the neutral, disengaged position.

11. A linear winding assembly device disposed within a fishing reel housing which is attached to a fishing rod by a stem, the linear winding assembly device is actuated by a user from a neutral position to an engaged position to rotate a main drive shaft whereby bail assembly is actuated to bring in the line, comprising:

a cylindrical slider member mounted within the stem and actuated for reciprocable upward and downward movement therein;

a trigger member secured to the slider member and actuated by the user for reciprocable upward and downward movement whereby the movement of the slider member is concomitant with the actuation of the trigger member;

a cylindrical pulley member mounted on the main drive shaft and actuated by the upward movement of the trigger whereby the pulley member rotates on the drive shaft;

connection means for connecting the trigger member to the pulley member so that the upward movement of the trigger member causes the pulley member to rotate on the main drive shaft;

a cylindrical drive gear fitted onto the pulley member and concentric with the pulley member whereby the cylindrical drive gear rotates concomitant with the rotation of the pulley member;

a driven gear mounted on the main drive shaft and which is encompassed by and concentric to the cylindrical drive gear so that the rotatable movement of the drive gear engages and causes rotatable movement of the driven gear;

a clutch bearing mounted to the drive shaft and which is fitted within and circumjacently encompassed by the driven gear whereby rotatable movement of the driven gear causes the bearing to lock onto the main drive shaft and rotate the main drive shaft for bringing in the fishing line; and a disengaging means for disengaging the drive gear from the driven gear and for returning the drive gear and the pulley member to the neutral position when the trigger member is released.

12. The winding assembly device of claim 11 wherein the connection means includes a bead chain having a first end attached to the trigger member and a second end connected to the pulley member whereby the upward movement of the trigger member pulls on the bead chain and causes rotatable movement of the pulley member about the main drive shaft.

13. The winding assembly device of claim 12 further comprising a cylindrical gear housing mounted within the fishing reel housing for pivotal movement therein and which encompasses the drive gear, the driven gear, and the clutch bearing, the pivotal movement of the gear housing concomitant with the rotation of the pulley member whereby the drive gear is eccentrically displaced from the pulley gear so that the drive gear can engage the driven gear.

14. The winding assembly device of claim 13 wherein the gear housing is concentric with the main drive shaft when in the neutral position and eccentric to the main drive shaft when in the engaged position.

15. The winding assembly device of claim 14 further comprising an auxiliary return spring having a first spring end attached to the gear housing and a second spring end attached to the fishing reel housing for facilitating return of the gear housing to the neutral position when the user releases the trigger member.

* * * * *